US006658567B1

(12) United States Patent
Barton et al.

(10) Patent No.: US 6,658,567 B1
(45) Date of Patent: Dec. 2, 2003

(54) METHOD AND LOGIC FOR LOCKING GEOLOGICAL DATA AND AN ANALYZER PROGRAM THAT ANALYZES THE GEOLOGICAL DATA

(75) Inventors: Colleen A. Barton, Portola Valley, CA (US); Daniel Moos, Palo Alto, CA (US); Mark Zoback, Palo Alto, CA (US)

(73) Assignee: GeoMechanics International, Inc., Palo Alto, CA (US)

( * ) Notice: Subject to any disclaimer, the term of this patent is extended or adjusted under 35 U.S.C. 154(b) by 0 days.

(21) Appl. No.: 09/340,216

(22) Filed: Jun. 25, 1999

(51) Int. Cl.⁷ .............................................. G06F 11/30
(52) U.S. Cl. ....................................... 713/193; 713/190
(58) Field of Search ......................... 707/9; 713/193, 713/190; 705/51; 340/853.1; 367/14, 81, 86

(56) References Cited

U.S. PATENT DOCUMENTS

| | | |
|---|---|---|
| 4,796,466 A | 1/1989 | Farmer |
| 4,945,775 A | 8/1990 | Adams et al. |
| 4,963,742 A | 10/1990 | Abernathy |
| 4,998,208 A | 3/1991 | Buhrow et al. |
| 5,078,006 A | 1/1992 | Maresca, Jr. et al. |
| 5,148,110 A | 9/1992 | Helms |
| 5,309,360 A | 5/1994 | Monk et al. |
| 5,311,591 A | 5/1994 | Fischer |
| 5,327,563 A | 7/1994 | Singh |
| 5,359,526 A | 10/1994 | Whittington et al. |
| 5,412,717 A | 5/1995 | Fischer |
| 5,415,033 A | 5/1995 | Maresca, Jr. et al. |
| 5,460,046 A | 10/1995 | Maltby et al. |
| 5,504,331 A | 4/1996 | Lane et al. |
| 5,675,251 A | 10/1997 | MacLean et al. |
| 5,692,047 A | 11/1997 | McManis |
| 5,724,425 A | 3/1998 | Chang et al. |
| 5,728,943 A | 3/1998 | Colter, Jr. et al. |
| 5,737,424 A | 4/1998 | Elteto et al. |
| 5,745,572 A | 4/1998 | Press |
| 5,764,231 A | 6/1998 | Ray et al. |
| 5,813,798 A | 9/1998 | Whiffen |
| 5,828,751 A | * 10/1998 | Walker et al. ............... 713/175 |
| 5,832,083 A | * 11/1998 | Iwayama et al. ............. 705/51 |
| 5,842,148 A | 11/1998 | Prendergast et al. |

(List continued on next page.)

OTHER PUBLICATIONS

Jean E. Sammet; "Using Computer Graphics to Interpret Simulation Output"; Software Patent Institute Database of Software Technologies; Record 4, Ser. No. acmr8109.0104; Sep. 1, 1981; 2 pgs.

Jean E. Sammet; "Finding Structure in Co–Occurrence Matrice for Texture Analysis"; Software Patent Institute Database of Software Technologies; Record 1; Ser. No. acmr8007.0154; Jul. 1, 1980; 3 pgs.

Aaron Finerman; "3.14 Earth Science"; Software Patent Institute Database of Software Technologies; Record 1, Ser. No. acmr6610.0022; Oct. 1, 1966; 3 pgs.

(List continued on next page.)

Primary Examiner—Thomas R. Peeso
(74) Attorney, Agent, or Firm—Blakely, Sokoloff, Taylor & Zafman LLP (57) ABSTRACT

A method of locking geological data, such as acoustic well bore logging information, and an analyzer program that analyzes the geological data commences with a generation of a first key. This first key is associated with both the geological data and a specific, compiled copy of the analyzer program. Gatekeeper logic is generated, the gatekeeper logic utilizing at least the first key to prevent the specific, compiled copy of the analyzer program from analyzing geological data other than the specific geological data. In this way, the specific copy of the analyzer program is locked to specific geological data, and is accordingly limited to performing analysis operations utilizing the specific geological data.

49 Claims, 8 Drawing Sheets

U.S. PATENT DOCUMENTS

| | | | |
|---|---|---|---|
| 6,014,343 | A | 1/2000 | Graf et al. |
| 6,055,213 | A | 4/2000 | Rubbo et al. |
| 6,101,447 | A | 8/2000 | Poe, Jr. |
| 6,138,076 | A | 10/2000 | Graf et al. |
| 6,167,348 | A | 12/2000 | Cannon |
| 6,239,593 | B1 | 5/2001 | Burkhardt et al. |
| 6,243,483 | B1 | 6/2001 | Petrou et al. |
| 6,256,603 | B1 | 7/2001 | Celniker |
| 6,257,332 | B1 | 7/2001 | Vidrine et al. |
| 2001/0014185 | A1 | 8/2001 | Chitradon et al. |

OTHER PUBLICATIONS

Aaron Finerman, et al.; "(Part 60 of 196) Bibliography"; Software Patent Institute Database of Software Technologies; Record 2, Ser. No. ACMR66.0066; 1967; 4 pgs.

True Seaborn; "Geographical Survey Computers Aid Energy Research"; Software Patent Institute Database of Software Technologies; Record 4; Ser. No. IEEE1105.0136; May 1, 1978; 2 pgs.

True Seaborn; "Structural/Syntactic"; Software Patent Institute Database of Software Technologies; Record 5; Ser. No. IEEE1512.0033; Dec. 1, 1982; 3 pgs.

Jean E. Sammet; "Pipeline"; Software Patent Institute Database of Software Technologies; Record 1; Ser. No. ACMGC80.0135; 1984; 2 pgs.

"Developing Applications on LOCK", Richard O'Brien and Clyde Rogers, *Proceedings of the 14th National Computer Security Conference*, Washington, D.C. Oct. 1991, pp 147–156.

"LOCK Trek: Navigating Uncharted Space", O. Sami Saydjari, Joseph M. Beckman and Jeffrey R. Leaman, , *1989 IEEE Computer Society Symposium on Security and Privacy*, May 1–3, 1989, Oakland, California.

\* cited by examiner

METHOD AND LOGIC FOR LOCKING GEOLOGICAL DATA AND AN ANALYZER PROGRAM THAT ANALYZES THE GEOLOGICAL DATA

FIELD OF THE INVENTION

The present invention relates generally to the field of software and data distribution and, more specifically to the distribution of geological data and an associated analyzer program that analyzes the geological data, the analyzer program being limited to analysis of the specific geological data.

BACKGROUND OF THE INVENTION

When surveying, or exploiting, a site for geological deposits (e.g., fossil fuels, water or minerals), geologists and engineers employed by an oil or a mining company typically require geological information regarding subterranean conditions and characteristics in order effectively to prospect the site, or extract the subterranean deposits in an efficient manner.

To this end, a number of logging companies will provide subterranean logging services to generate geomechanical, petrophysical, in situ stress or well bore data that is useful to the geologists and engineers. For example, geologists would be particularly interested in identifying the in situ stress state or distribution, orientation and properties of natural fracture systems within a subterranean environment, and also the petrophysical properties of rock formations. This information may then be utilized by the geologists to create a geotechnical site characterization.

The above mentioned logging operations are performed by lowering a probe, which may form a number of acoustic, magnetic, nuclear and electrical probe operations, down a well or bore hole drilled into a subterranean environment of interest. The geological data gathered by the probe is then utilized to generate a number of images to assist the geologists and engineers in making various determinations regarding a specific site and to develop accurate geological site characterizations.

The interpretation of geological data generated, for example, as a result of a logging operation may be performed by a number of analyzer programs that process the logged data for presentation to geologists in a meaningful way. Such analyzer programs typically read the logged geological data, filter and enhance this data, and then provide some form of graphical display or analysis utilizing the data. An example of such analyzer software is the GMI-Imager™ software developed by GeoMechanics International, Incorporated of Palo Alto, Calif. The GMI-Imager software aids geologists and scientists in the analysis of the stratigraphic, structural features and mechanical failures observant in borehole image data.

It is a typical business practice for a logging company, which performs the logging operations to generate the logged data, to retain access to the logged geological data, and to provide this geological data to a customer in a processed and analyzed format upon request. For example, should a drilling company require the geological data for a specific purpose (e.g., to produce a well bore image plot showing specific subterranean characteristics), the drilling company may request this plot from the logging company. The logging company will then, utilizing a specific analyzer program, generate the requested plot. The drilling company then is required to pay and compensate the logging company for each plot generated.

It would be advantageous if the user of the logged geological data, (e.g., a drilling company) could be enabled to have control of both the geological data and an analyzer program for generating multiple plots utilizing the geological data as and when needed. However, the cost of an analyzer program may be prohibitively expensive and economically unattractive to a drilling company.

SUMMARY OF THE INVENTION

According to first aspect of the invention, there is provided a method of locking geological data, and an analyzer program that analyzes the geological data. A first key is generated and associated with both specific geological data and a specific copy of the analyzer program. Gatekeeper logic is generated, the gatekeeper logic utilizing at least the first key to prevent the specific copy of the analyzer program from analyzing geological data other than the specific geological data.

According to a second aspect of the invention, there is provided a method of executing an analyzer program to analyze geological data to which it is locked. A first key associated with a specific copy of the analyzer program is determined. A second key associated with specific geological data is determined. A characteristic parameter representative of a characteristic of the specific geological data is determined. A gate key is derived utilizing the second key and the characteristic parameter. Execution of the specific copy of the analyzer program, for the purpose of analyzing the specific geological data, is allowed if the gate key corresponds to the first key.

According to a third aspect of the present invention, there is provided a method of executing an analyzer program to analyze geological data to which it is locked. A first key, associated with a specific copy of the analyzer program, is determined. A second key, associated with specific geological data, is determined. A characteristic parameter, representative of a characteristic of the specific geological data, is determined. A gate key is derived utilizing the first key and the characteristic parameter. Execution of the specific copy of the analyzer program to analyze the specific geological data is allowed if the gate key corresponds to the second key.

According to a fourth aspect of the present invention, there is provided a method of distributing geological data and analyzer program that analyzes the geological data. A user of the analyzer program is provided with a specific copy of the analyzer program and specific geological data, the specific copy of the analyzer program and the specific geological data being locked utilizing at least a first key. The user of the analyzer program is provided with gatekeeper logic that, utilizing at least the first key, allows the specific copy of the analyzer program to analyze only the specific geological data.

According to a fifth aspect of the present invention, there is provided a method of distributing geological data and an analyzer program that analyzes the geological data. A user of the analyzer program is provided with a specific copy thereof. The user of the analyzer program is also provided with locking logic that locks the specific copy of the analyzer program to selected geological data. The user of the analyzer program is also provided with gatekeeping logic that allows the specific copy of the analyzer program to analyze only the selected geological data.

According to a sixth aspect of the present invention, there is provided a method of distributing geological data and an application program that accesses the geological data. A specific copy of the application program is locked to specific geological data so that the specific copy of the application program is able to access only the specific geological data. The locked specific copy of the application program and the specific geological data are distributed to a user.

According to a seventh aspect of the present invention, there is provided a logic set for locking geological data and an analyzer program that analyzes the geological data. The apparatus includes first logic to generate a first key, second logic to associate the first key with both specific geological data and a specific copy of the analyzer program. Third logic generates gatekeeper logic that, utilizing at least the first key, prevents the specific copy of the analyzer program from analyzing geological data other than the specific geological data.

According to an eighth aspect of the present invention, there is provided a logic set for executing an analyzer program to analyze geological data to which the analyzer program is locked. First logic identifies a key associated with the specific copy of the analyzer program. Second logic identifies a second key associated with specific geological data. Third logic determines a characteristic parameter representative of a characteristic of the specific geological data. Fourth logic derives a gate key utilizing the second key and the characteristic of the parameter. Fifth logic allows execution of the specific copy of the analyzer program to analyze the specific geological data if the gate key corresponds to the first key.

According to a further aspect of the present invention, there is provided a machine-readable medium storing a sequence of instructions stored thereof that, when executed by machine, causes the machine to perform the steps of any of the methodologies discussed above.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and logic for locking geological data and an analyzer data program that analyzes the geological data are described. In the following description, for purposes of explanation, numerous specific details are set forth in order to provide a thorough understanding of the present invention. It will be evident, however, to one skilled in the art that the present invention may be practiced without these specific details.

For the purposes of the present invention, the term "geological data" shall refer to any data pertaining the structure, constitution, features, conditions or characteristics of a subterranean environment. To this end, for purposes of the specification, the term "geological data" shall be taken to include, but not be limited to geomechanical, geophysical, in situ stress, petrophysical, geotechnical, acoustic wave form, magnetic wave resonance or any other information derived using a logging device within a well or bore hole.

For the purposes of the present specification, the term "analyzer program" shall be taken to refer to any program that analyzes data for the purpose of presenting, interpreting or modifying the data. Accordingly, the operations performed by an analyzer program include, but are not limited to, the extraction of data, the generating of data, the interpretation of data, the display of data, the filtering of data, and the enhancing of data.

Figure 1:
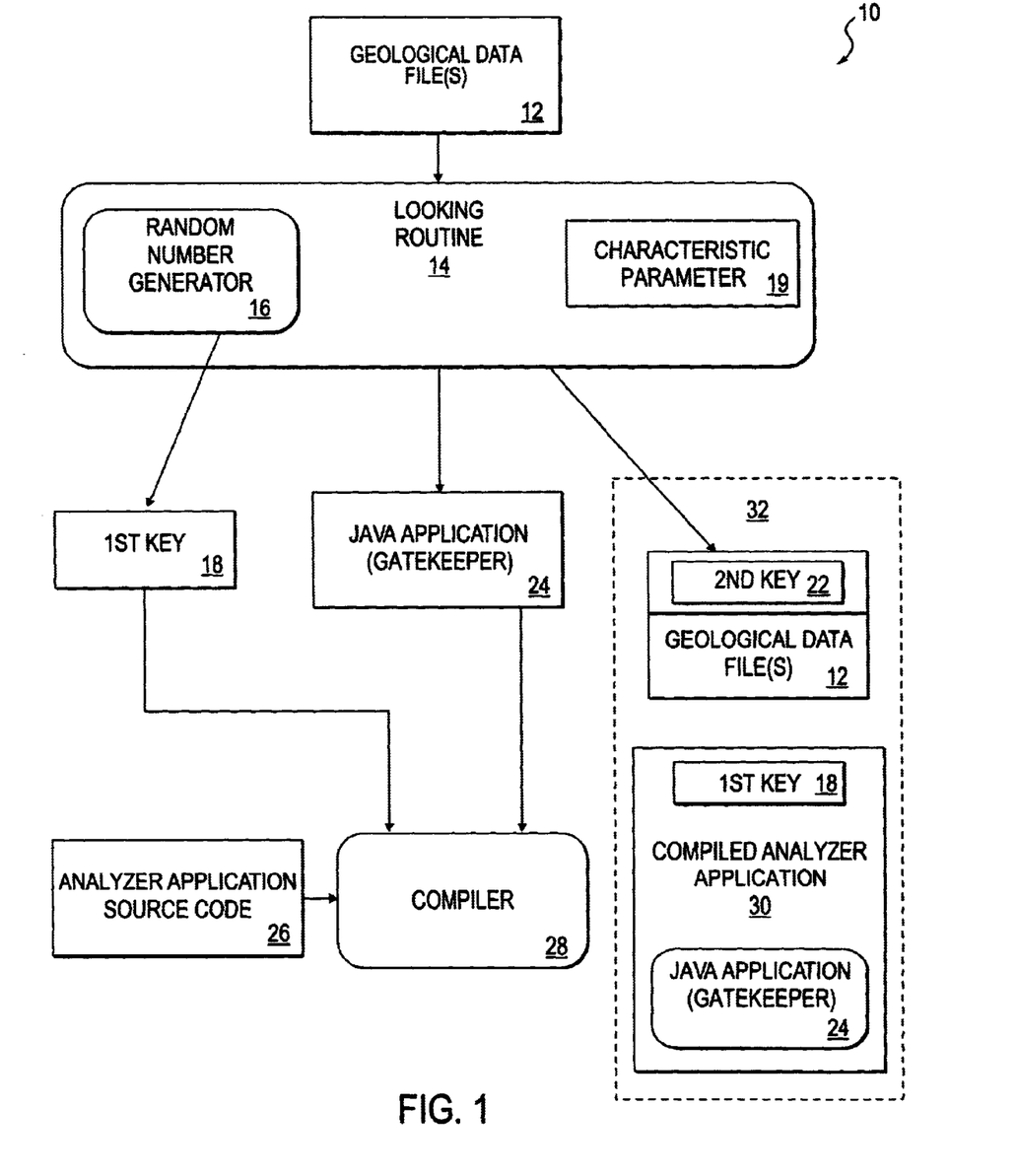
FIG. 1 is a block diagram illustrating an exemplary system for locking geological data and an analyzer program that analyzes the geological data.

FIG. 1 is a block diagram illustrating a system 10, according to an exemplary embodiment of the present invention, for locking geological data and an analyzer program that analyzes the geological data. The system 10 includes geological data files 12, that may for example comprise logged acoustic data, electrical data, or optical data. The geological data files 12 are inputted to an encryption or locking routine 14 that operates to lock the geological data files 12 to a specific copy of an analyzer program, so that the specific copy of the analyzer program is enabled only to analyze the specific geological data files 12, and no other geological files. To this end, the locking routine 14 includes a random number generator 16 that generates a first key 18, which in one embodiment of the present invention comprises a simple random number. It will be appreciated that the first key 18 could either comprise any random character sequence.

The locking routine 14 furthermore operates to identify a specific characteristic of each of the geological data files 12, and to assign a characteristic value to a characteristic parameter indicative of the particular characteristic of each geological data file 12. For example, the characteristic parameter may be the size of a geological data file 12, and the characteristic value attributed to this parameter may be actual size of a geological data file 12 expressed in bits, bytes or any other measure.

The locking routine 14 further generates a second key 22 for each of the files 12, which is associated with a respective geological data file 12, utilizing the first key and the characteristic value for a respective file 12. For example, the logging routine 14 may simply exclusive OR (XOR), the first key and the characteristic parameter to generate the second key 22. The locking routine 14 then writes a respective second key 22 into a header portion of each of the files 12, as illustrated in FIG. 1. Alternatively, the second key 22 may be inserted into a geological data file 12 in a manner that is not so easily discernable. For example, the second key 22 may be fractured and pieces thereof inserted at predetermined locations throughout a geological data file 12 by the locking routine 14.

The locking routine 14 furthermore generates a gatekeeper application 24, in the exemplary form of a Java™ applet, that implements an "unlocking" function with respect to the geological data files 12 and a specific copy of an analyzer program so as to permit the analyzer program to analyze the geological data files. Further information regarding the gatekeeper application 24 is provided below.

Source code 26 for an analyzer application (e.g., the GMI-Imager software developed by GeoMechanics International, Incorporated), the first key 18, and the gatekeeper application 24 are provided to a compiler 28 that recompiles the source code 26 to generate a specific compiled copy of the analyzer application 30 that incorporates the first key 18 and the gatekeeper application 24. The geological data files 12 and the compiled analyzer application 30 may together comprise a single package 32 that is supplied to an end user. For example, the geological data files 12 and the compiled copy of the analyzer application 30 may be written to a single compact disk that is supplied to the end user. Alternatively, the geological data files 12 and the specific copy of the analyzer application 30 may be propagated to an end user from a source over a network.

It should be noted that a single first key 18 may be utilized by the locking routine 14 to generate multiple and distinct second keys 22 for each of a plurality of geological data files 12. This may be achieved by performing an operation utilizing the first key 18 and a specific characteristic value for each distinct geological data files 12 to generate a distinct second key 22 for each such geological data file 12. Accordingly, the package 32 may comprise a single copy of a compiler analyzer application 30 that is able to analyze multiple geological data files 12 only each having a different and unique second key 22.

Figure 2:
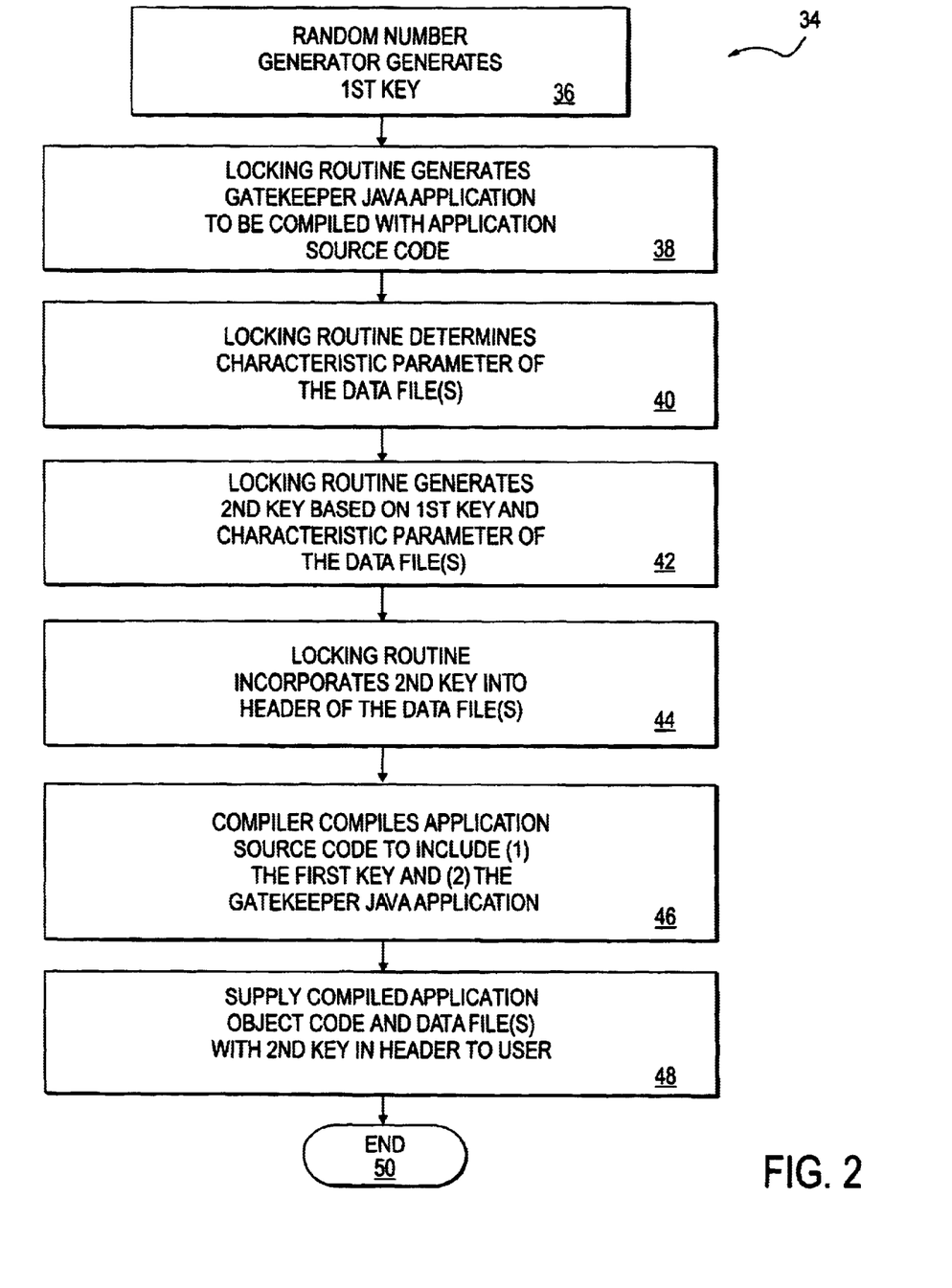
FIG. 2 is a flow chart illustrating a method, according to an exemplary embodiment of the present invention, of locking geological data and an analyzer program so that a specific copy of the analyzer program is enabled to analyze only specific geological data.

FIG. 2 is a flow chart illustrating a method 34, according to an exemplary embodiment of the present invention, of locking geological data and an analyzer program so that a specific copy of an analyzer program is enabled to analyze only specific geological data.

The method commences at step 36, with the generation of the first key 18 by the random number generator at 16.

At step 38, the locking routine 14 generates the gatekeeper application 24 that is to be compiled with the analyzer application source code 26.

At step 40, the locking routine 14 determines a characteristic value for a characteristic parameter of at least one geological data file 12. As discussed above, the locking routine 14 may determine a respective characteristic value for a number of geological data files 12. The characteristic value may be, merely for example, the size of a respective geological data file.

At step 42, the locking routine 14 then generates a respective second key 22 for each geological data file 12 utilizing the first key 18 and the respective characteristic value 19 for the relevant data file. This may be performed by XORing the best key with the characteristic value 19 for each respective geological data file 12 to generate the second key 22 for the respective geological data file 12.

At step 44, the locking routine 14 incorporates the second key 22 into the header of each respective geological data file 12. Discussed above, in an alternative embodiment, a second key 22 for each respective geological data file 12 may be distributed throughout the file 12 at predetermined and known locations.

At step 46, the compiler 28 then compiles the analyzer application source code 26 to include the first key 18 and the gatekeeper application 24, to generate a specific and compiled copy of the analyzer application 30.

At step 48, the specific and compiled copy of the analyzer application 30 (i.e., object code) and the geological data files 12 that the analyzer application can access and analyze, are supplied to the end user. The method 34 then ends at step 50.

Figure 3A:
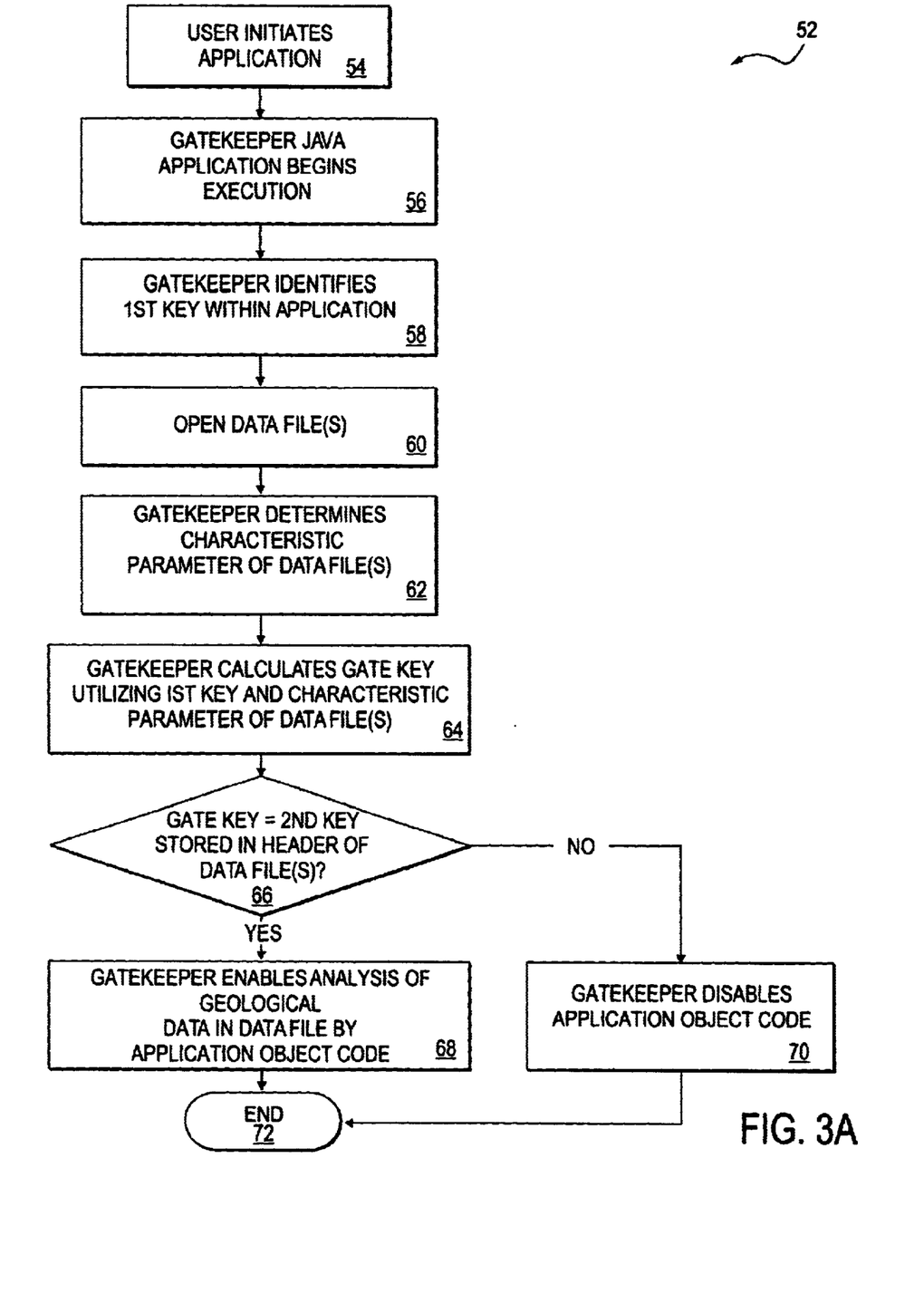
FIG. 3A is a flow chart illustrating a method, according to an exemplary embodiment of the present invention, of executing an analyzer program to analyze geological data to which it is locked.

FIG. 3A is a flow chart showing a method 52, according to an exemplary embodiment of the present invention, of executing an analyzer program to analyze geological data to which it is locked.

The method 52 commences at step 54, with the initiation or launch by an end user of the specific and compiled copy of the analyzer application 30 shown in FIG. 1 and supplied to the user at step 48 of the method 34 illustrated in FIG. 2.

At step 56, the gatekeeper application 24 identifies the first key 18 within the specific copy of the analyzer application 30. At step 60, the gatekeeper application 24 opens the geological data files 12 and, at step 62, determines a characteristic value for a characteristic parameter of each of the geological data files 12. For example, the gatekeeper application 24 may ascertain the size of each of the geological data files 12.

At step 64, the gatekeeper application 24 calculates a gate key for each of the geological data files 12 utilizing the first key identified at step 58 and the respective characteristic value for characteristic parameter for each of the geological data files 12. The calculation of the gate key may comprise performing a XOR operation utilizing the first key 18 and the determined characteristic value for the characteristic parameter for each of the geological data files 12.

At decision box 66, a determination is made as to whether the gate key generated for each of the geological data files 12 corresponds to a respective second key 22 stored, for example, in the header portion of the respective geological data file 12.

Following a positive determination at decision box 66, for a specific geological data file 12, the gatekeeper application 24 enables analysis of the specific geological data file 12 by the compiled and specific copy of the analyzer application 30.

On the other hand, following a negative determination for a specific geological data file 12 at decision box 66, the gatekeeper application 24 disables the compiled and specific copy of the analyzer application 30 from analyzing the relevant data file 12.

The method then ends at step 72.

Figure 3B:
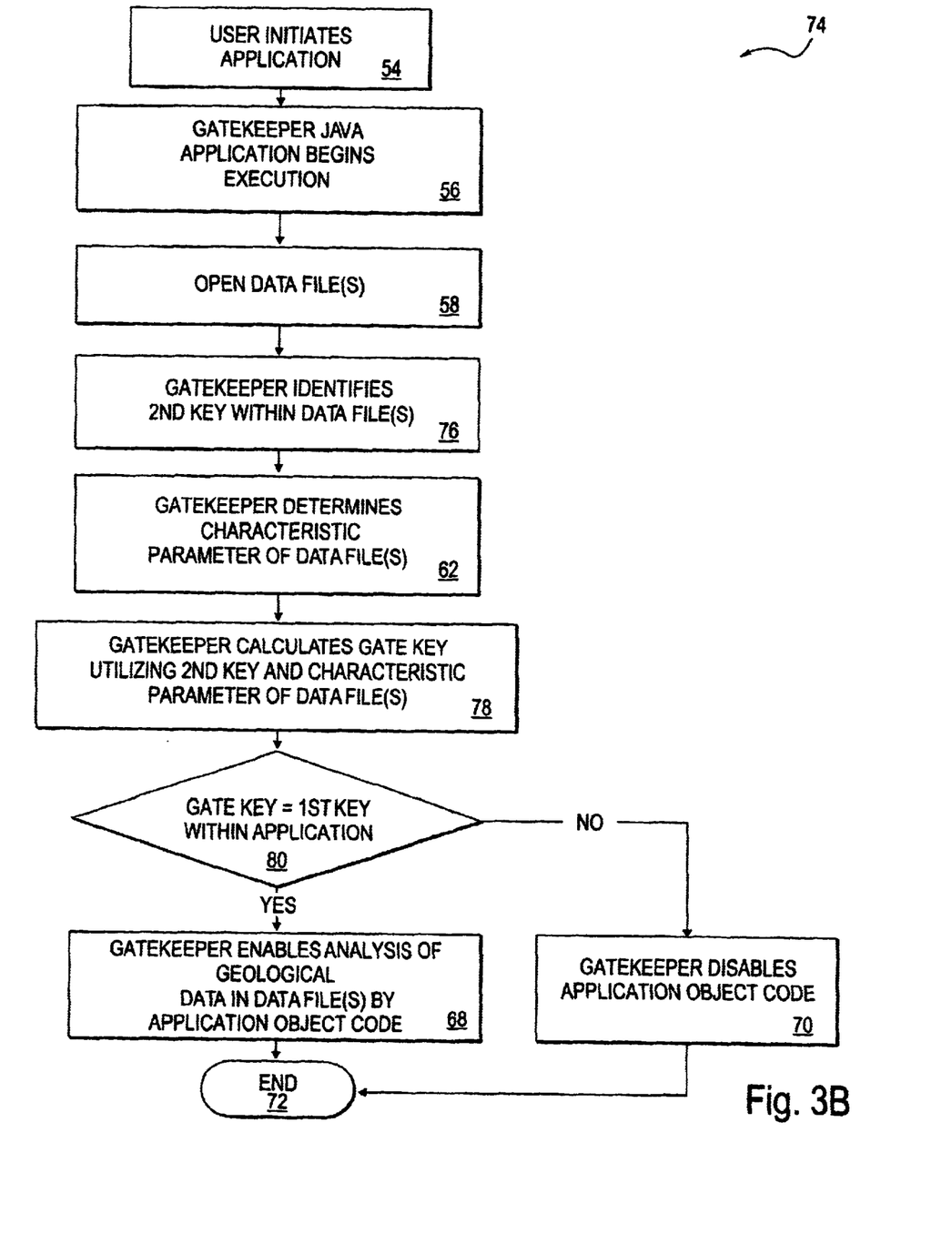
FIG. 3B is a flow chart illustrating an alternative method, according to an exemplary embodiment of the present invention, of executing an analyzer program to analyze geological data to which it is locked.

FIG. 3B is a flow chart illustrating an alternative method 74, according to an exemplary embodiment of the present invention, of executing an analyzer program to analyze geological data to which it is locked.

The method 74 corresponds substantially to the method 52 discussed above with respect to FIG. 3A, but differs in that at step 76, the gatekeeper application 24 identifies the second key 22 of a specific geological data file 12, and then at step 78 calculates the gate key utilizing this second key 22 and the characteristic value of the relevant file 12.

At decision box 80, the gatekeeper application 24 makes a determination as to whether the gate key corresponds to the first key 18 embedded within the compiled and specific copy of the analyzer application 30 to determine whether or not the compiled and specific copy of the analyzer application 30 will be enabled to analyze the relevant geological data file 12.

In summary, the methods 52 and 74 differ in that, in the method 52, the first key 18 is utilized together with the characteristic parameter to determine the gate key which is then compared to the second key 22 stored within the geological data file 12, whereas in method 74, the second key 22 is utilized to generate the gate key, that is then compared to the first key 18 embedded within the compiled and specific copy of the analyzer application 30.

Figure 4A:
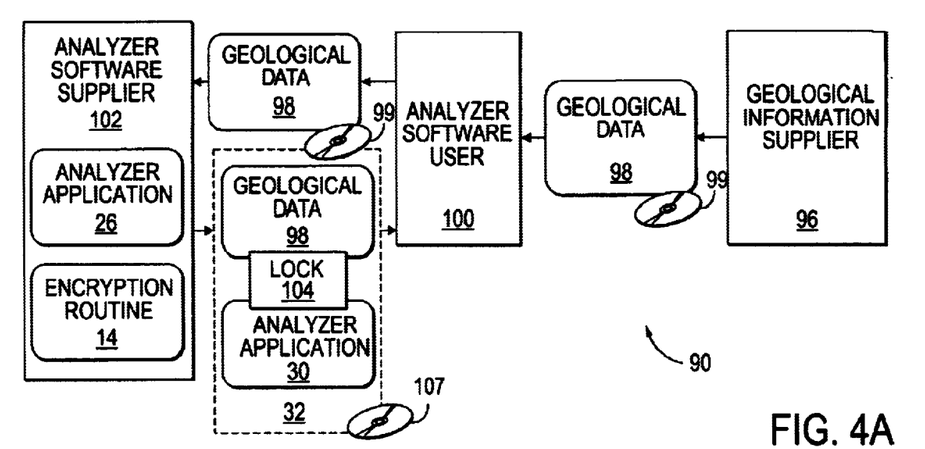
FIGS. 4A–4C illustrate methods, according to alternative embodiments of the present invention, of distributing geological data and an analyzer program that analyzes the geological data to an end user of the geological data and the analyzer program.
Figure 4B:
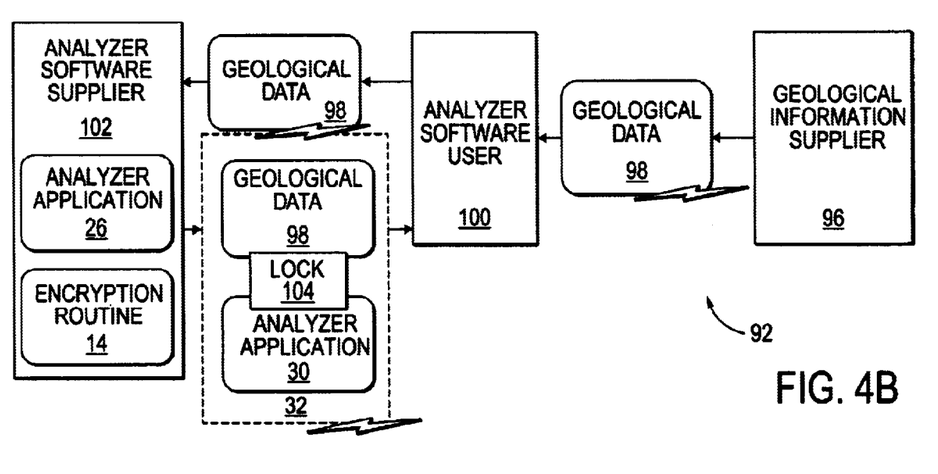
Figure 4C:
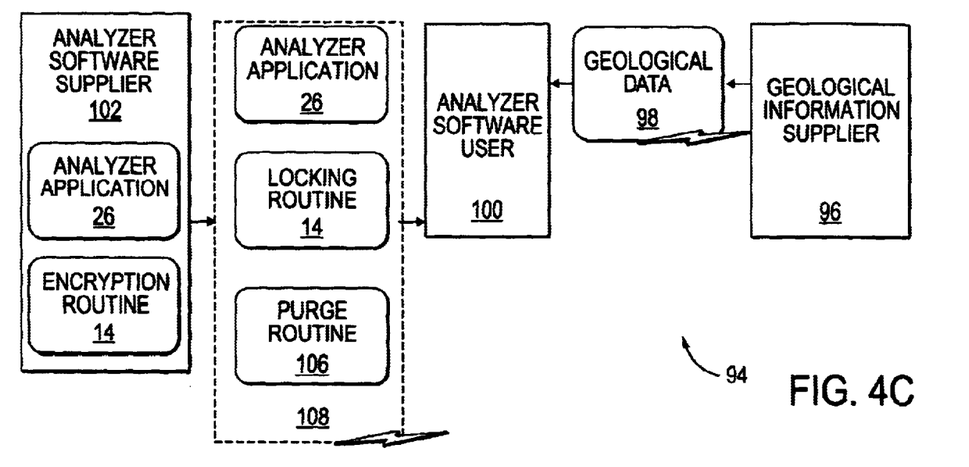

FIGS. 4A–4C illustrate methods 90, 92 and 94, according to alternative embodiments of the present invention, of distributing geological data and an analyzer program that analyzes the geological data to an end user of the geological data and the analyzer program.

Referring first to FIG. 4A, a geological information supplier 96, for example Schlumberger Limited of New York, N.Y., supplies geological data 98 stored on a Compact Disk (CD) 99 to the end user 100. The end user 100 then provides the geological data 98 on the CD 99 to the analyzer software supplier 102.

Having received the geological data 98 from the end user 100, the software supplier 102 will then proceed, utilizing the locking (or encryption) routine 14 to compile the analyzer application source code 26 to include the geological data 98 and the locking (or encryption) routine 14 to thereby generate the package 32. As described above with reference to FIG. 1, the package 32 comprises object code that constitutes a compiled and specific copy of the analyzer application 30, and one or more geological data files 12. The gatekeeper application 24, in conjunction with the first and second keys 18 and 22 constitutes a lock 104 illustrated in FIG. 4A. The package 32 may be written to a compact disk 107, that is then supplied back to the end user 100.

Utilizing the compact disk 107, the end user 100 may then execute the analyzer application 30 to analyze only the geological data 98, and no further geological data.

The above discussed method 90 of distribution of the locked analyzer application 30 and geological data 98 is advantageous to the analyzer software supplier 102, as the supplier 102 is able to incrementally recover the cost of the analyzer application by supplying multiple copies of an analyzer application 30, each copy being locked to predetermined geological data 98, to the end user 100. Each compiled and specific copy of the analyzer application 30 is supplied at a reduced price relative to the cost of supply of an unencumbered or "unlocked" analyzer program that is not limited to specific geological data, and that would be able to analyze any given geological data. By supplying numerous copies of compiled and specific analyzer applications 30 to the end user, the supplier 102 will thus be able to generate a steady revenue flow from the end user 100 and recover a "full" price for the program over time.

From the point of view of the end user 100, the distribution method 90 discussed above with reference to FIG. 4A is advantageous in that, instead of being required to buy an "unlocked" copy of the analyzer program for a relatively high (and sometimes unaffordable) cost, the end user 100 incurs incremental and time-distributed costs for use of the analyzer program. A further benefit to the end user 100 is that the distribution method 90 implements an alternative to a "pay-per-use" system, and thus provides advantages in that the cost to the end user 100 of the analyzer application 30 is linked to the usage and value to the company of specific geological data 98.

FIG. 4B shows an alternative method 92 of distributing geological data and an analyzer program that analyzes the geological data to an end user 100. The method 92 corresponds substantially to the method 90 with reference to FIG. 4A, but differs in that, instead of the geological data 98 being propagated between the geological information supplier 96, the end user 100 and the analyzer software supplier 102 on a compact disk, the relevant data and applications are transmitted via a network (not shown). The network may be a wire or wireless, and may comprise the Internet, a Wide Area Network (WAN) or a Local Area Network (LAN). The method 92 may provide some cost advantages over the method 90, and may also be more convenient in certain circumstances.

FIG. 4C shows a further method 94 of distributing geological data and an analyzer program, which are locked, to an end user 100. While the geological information supplier 96 provides the geological data 98 to the end user 100, as in the methods 90 and 92 above, this geological data 98 is not provided to the analyzer software supplier 102. In the method 94, the analyzer software supplier 102 provides a further package 108 to the end user 100, the package 108 including a copy-protected and read-protected copy of the analyzer application source code 26, a copy of the locking routine 14, and a purge routine 106. The end user 100 then executes the locking routine 14 to enable the analyzer application 30 locally to generate the first key 18, the gatekeeper application 24 and the second key 22. Following compilation of a specific and compiled copy of the analyzer application 30, and the embedding of the second key 22 within a geological data file 12, the purge routine 106 will then automatically be invoked to purge the locking routine 14 and the analyzer application source code 26 from a computer system operated by the end user 100. The end user 100 will then retain only the package 32, the other software having been purged from a relevant computer system by the purge routine 106.

The method 94 illustrated in FIG. 4C is advantageous in that it is not required that the geological data 98 be provided from the end user 100 to the analyzer software supplier 102. On the other hand, the generation of the locked analyzer application 30 and geological data 98 at an end-user site may be undesirable, and may be unattractive to an end user 100.

Figure 5:
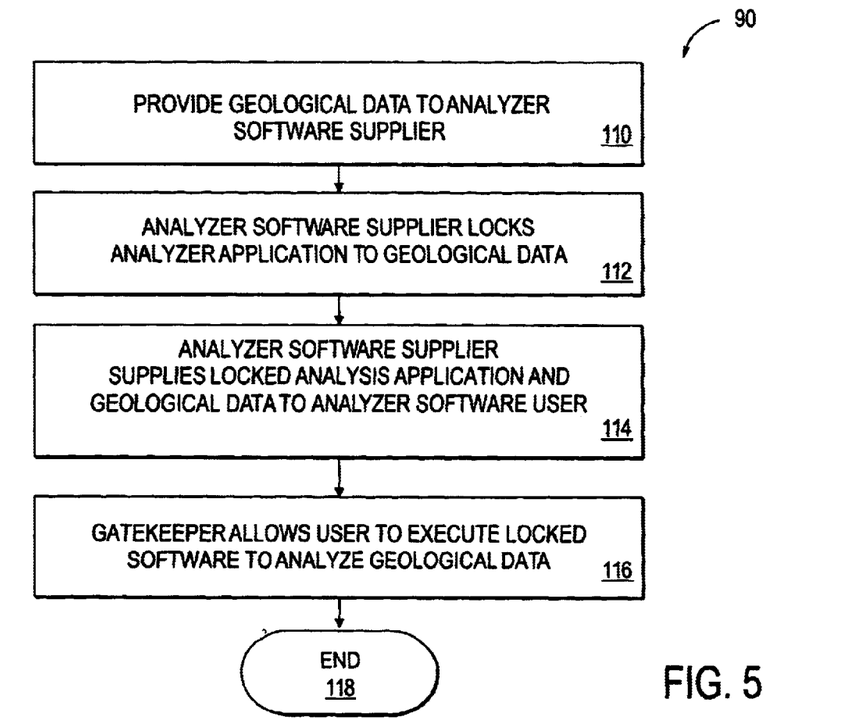
FIG. 5 is a flow chart illustrating a method, according to an exemplary embodiment of the present invention, that may be performed by a geological information supplier, an end user, and an analyzer program software supplier to implement the method illustrated in FIGS. 4A–4C.

FIG. 5 is a flow chart illustrating the steps performed by the geological information supplier 96, the end user 100 and the analyzer software supplier 102 as described above with reference to FIG. 4. At step 110, the geological data 98 is provided to the analyzer software supplier 102 from the geological information supplier 96 via the end user 100. At step 112, the analyzer software supplier 102 then locks the analyzer application 30 to the geological data 98.

At step 114, the analyzer software supplier 102 supplies the locked analyzer application 30 and geological data 98 to the end user 100.

At step 116, the gatekeeper application 24, embedded within the analyzer application 30, allows a user to execute the locked software to analyze only the specific geological data 98.

The method 90 described above with reference to FIG. 5 also embodies the steps performed when executing the method 92 discussed above with reference to FIG. 4B.

Figure 6:
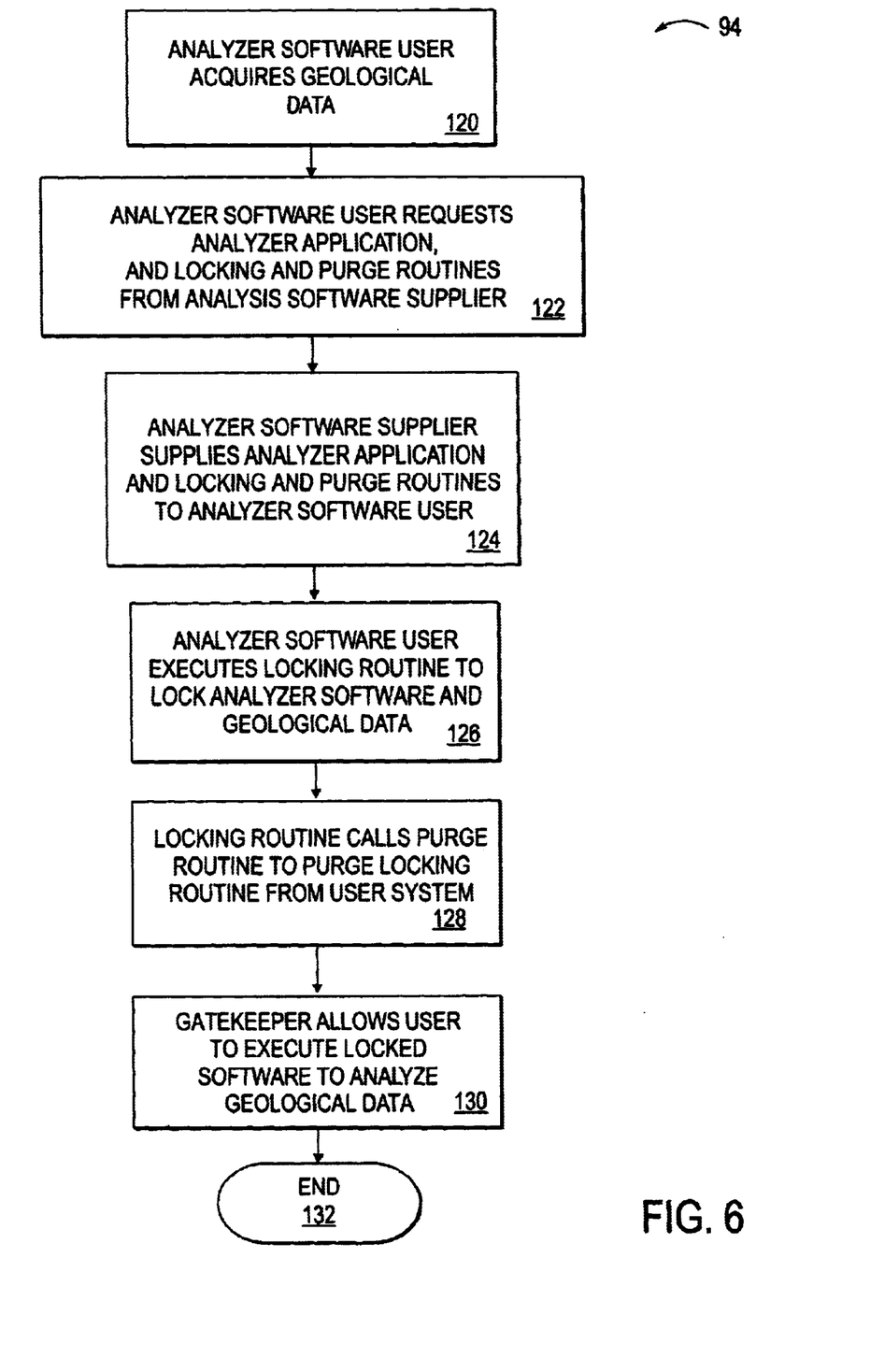
FIG. 6 is a flow chart illustrating a method, according to an exemplary embodiment of the present invention, of distributing geological data and an analyzer program to an end user.

FIG. 6 is a flow chart illustrating a method 94, according to an exemplary embodiment of the present invention, of distributing geological data and an analyzer program to an end user. The method 94 is performed by the geological information supplier 96, the end user 100 and the analyzer software supplier 102.

At step 120, the end user 100 acquires the geological data 98 from the geological information supplier 96.

At step 112, the end user 100 requests an analyzer application source code 26, as well as the locking and purging routines 14 and 106, from the analyzer software supplier 102.

At step 124, the analyzer software supplier 102 supplies the analyzer application source code 26, which is copy and read protected, to the end user 100. The supplier 102 also provides the locking routine 14 and purge routine 106.

At step 126, the end user 100 then executes the locking routine 14 to lock the geological data 98 to a specific and compiled copy of the analyzer application 30. This may involve generating the gatekeeper application 24, and performing a compile operation utilizing a compiler 28 as described with reference to FIG. 1. In an exemplary embodiment of the present invention, the compiler 28 comprises the Code Warrior compiler software developed by Metrowerks, Incorporated.

At step 128, the locking routine 14 calls the purge routine 106 to purge the locking routine and the analyzer application source code 26 from the computer system of the end-user 100.

At step 130, the gatekeeper application 24 allows the end user 100 to execute the analyzer application 30 to analyze the geological data 98, and no other geological data, to which is locked. The method 94 then ends at step 132.

Figure 7:
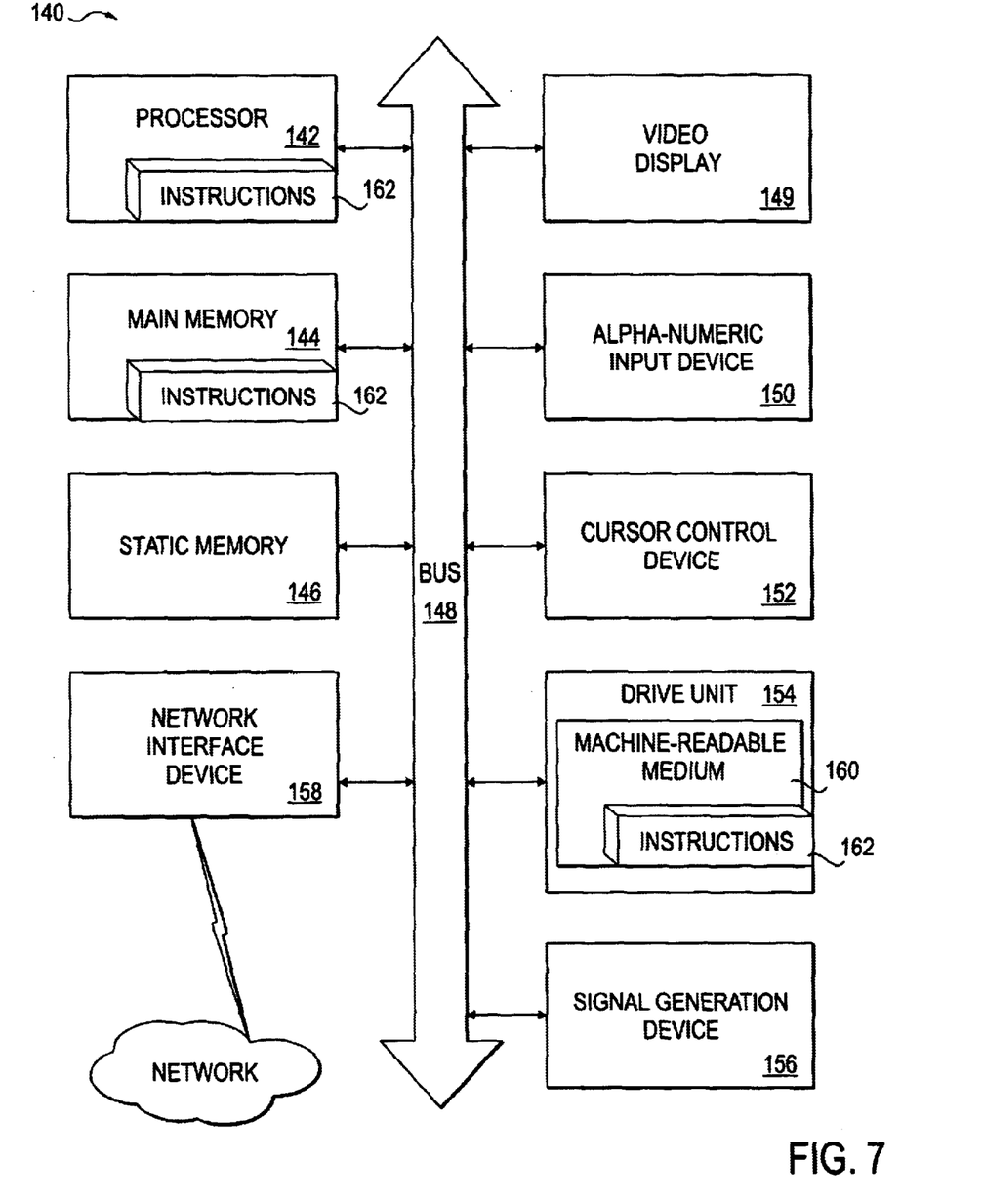
FIG. 7 is a block diagram illustrating a machine, in the exemplary form of a computer system, within which a set of instructions for causing the computer system to perform any of the methodologies discussed above may be executed.

FIG. 7 is a block diagram illustrating a machine, in the exemplary form of a computer system 140, within which a set of instructions, for causing the computer system 140 to perform any one of the methodologies discussed above, may be executed. The computer system 140 includes a processor 142, a main memory 144, and a static memory 146 that communicate with each other via a bus 148. The computer system 140 further includes a video display unit 149 (e.g., a liquid crystal display (LCD) or a cathode ray tube (CTR)). The computer system 140 further includes an alpha-numeric input device 150 (e.g., a keyboard), a cursor control device 152 (e.g., a mouse), a disk drive unit 154, a signal generation device 156 (e.g., a speaker) and a network interface device 158.

The disk drive unit 154 includes a machine-readable medium 160 on which is stored a set of instructions (i.e., software 162) embodying any one, or all, of the methodologies discussed above. The software 162 is also shown to reside, completely or at least partially, within the main memory 144 and/or within the processor 142. The software 162 may furthermore be transmitted or received via the network interface device 158.

For the purposes of this specification, the term "machine-readable medium" shall be taken to include any medium which is capable of storing or embodying a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and logic for locking geological data and an analyzer data program that analyzes the geological data have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of locking geological data and an analyzer program that analyzes the geological data, the method including:

generating a first key;

associating the first key with both specific geological data and a specific copy of the analyzer program; and generating gatekeeper logic that, utilizing at least the first key, prevents the specific copy of the analyzer program from analyzing geological data other than the specific geological data;

wherein the associating of the first key with the specific geological data includes generating a second key utilizing the first key and a characteristic value for a charactrtistic parameter representative of a characteristic of the specific geological data.

2. The method of claim 1 wherein the generating of the first key includes generating a random character sequence.

3. The method of claim 2 wherein the random character sequence is a random number sequence.

4. The method of claim 1 including, responsive to a modification of the characteristic value, re-generating the second key utilizing the modified characteristic value.

5. The method of claim 1 including incorporating the second key within a header of a data file including the specific geological data.

6. The method of claim 1 wherein the associating of the first key with the specific copy of the analyzer program includes compiling the specific copy of the analyzer program to incorporate the first key.

7. The method of claim 1 wherein the generating of the gatekeeper logic includes associating the gatekeeper logic with the specific copy of the analyzer program.

8. The method of claim 7 wherein the associating of the gatekeeper logic with the specific copy of the analyzer program includes compiling the specific copy of the analyzer program to incorporate the gatekeeper logic.

9. The method of claim 1 wherein the generating of the gatekeeper logic comprises generating a Java-programming language application that is incorporated within the specific copy of the analyzer program.

10. The method of claim 1 wherein a user of the analyzer program supplies the specific geological data to a supplier of the analyzer program, and a locking of the specific geological data to the specific copy of the analyzer program occurs on a computer system of the supplier.

11. The method of claim 10 wherein the supplier provides the locked specific geological data and the specific copy of the analyzer program to the user.

12. The method of claim 1 wherein a supplier of the analyzer program supplies locking logic and the analyzer program to a user of the analyzer program, and a locking of the specific geological data to the specific copy of the analyzer program occurs on a computer system of the user utilizing the supplied locking logic and the supplied analyzer program.

13. A method of executing an analyzer program to analyze geological data to which it is locked, the method including:

determining a first key associated with a specific copy of an analyzer program;

determining a second key associated with specific geological data;

determining a characteristic parameter representative of a characteristic of the specific geological data;

deriving a gate key utilizing the second key and the characteristic parameter; and allowing execution of the specific copy of the analyzer program to analyze the specific geological data if the gate key corresponds to the first key.

14. A method of executing an analyzer program to analyze geological data to which it is locked, the method including:

determining a first key associated with a specific copy of an analyzer program;

determining a second key associated with specific geological data;

determining a characteristic parameter representative of a characteristic of the specific geological data;

deriving a gate key utilizing the first key, and the characteristic parameter; and allowing execution of the specific copy of the analyzer program to analyze the specific geological data if the gate key corresponds to the second key.

15. A method of distributing geological data and an analyzer program that analyzes the geological data, the method including:

providing a user of the analyzer program with a specific copy of the analyzer program and specific geological data that are locked utilizing at least a first key; and providing the user of the analyzer program with gatekeeper logic that, utilizing at least the first key, allows the specific copy of the analyzer program to analyze only the specific geological data, the method further including:

associating the first key with both the specific copy of analyzer program and the specific geological data;

determining a characteristic value for a characteristic parameter representative of a characteristic of the specific geological data;

generating a second key utilizing the first key and the characteristic value; and including the second key within the specific geological data.

16. The method of claim 15 wherein the providing of the gatekeeper logic includes compiling the specific copy of the analyzer program to include the gatekeeper logic, and providing the user with the compiled specific copy of the analyzer program.

17. The method of claim 15 wherein the associating of the first key with the specific copy of the analyzer program includes compiling the specific copy of the analyzer program to include the first key.

18. A method of distributing geological data and an analyzer program that analyzes the geological data, the method including:

providing a user of the analyzer program with a specific copy of the analyzer program;

providing the user of the analyzer program with locking logic that locks the specific copy of the analyzer program to selected geological data; and providing the user of the analyzer program with gatekeeper logic that allows the specific copy of the analyzer program to analyze only the selected geological data;

wherein the locking logic is to generate a second key that is associated with the selected geological data, the second key being generated utilizing the first key and a characteristic parameter representative of a characteristic of the selected geological data.

19. A method of distributing geological data and an application program that accesses the geological data, the method including:

locking a specific copy of the application program to specific geological data so that the specific copy of the application program is able to access only the specific geological data; and distributing the locked specific copy of the application program and specific geological data to a user, wherein the locking of the specific copy of the application program to the specific geological data includes generating a second key that is associated with the specific geological data, the second key being generated utilizing a first characteristic parameter representative of a characteristic of the specific geological data.

20. The method of claim 19 wherein the locking of the specific copy of the application program to the specific geological data includes generating a first key that is associated with both the specific copy of the application program and the specific geological data.

21. The method of claim 20 wherein the generating of the first key comprises generating a random key utilizing a random character generator.

22. The method of claim 20 wherein the generating of the first key comprises generating a random number using a random number generator.

23. The method of claim 19 wherein the locking of the specific copy of the application program to the specific geological data includes generating a gatekeeper application that allows utilization of the specific copy of the application program when accessing the specific geological data, and disallows utilization of the application program when accessing other geological data.

24. The method of claim 23 including distributing the gatekeeper application to the user, the gatekeeper application accessing at least the first key for the purposes of allowing or disallowing utilization of the specific copy of the application program.

25. The method of 24 wherein the gatekeeper determines a second characteristic parameter representative of the characteristic of the specific geological data, generates a gate key utilizing the first key and the second characteristic parameter, and compares the gate key to the second key for the purposes of allowing or disallowing user utilization of the specific copy of the application program.

26. The method of claim 19 wherein the locking of the specific copy of the application program to the specific geological data includes compiling source code for the application program, together with the first key and the gatekeeper application, into compiled object code for the specific copy of the application program.

27. The method of claim 19 wherein the locking is performed by locking logic, and the method includes sending the specific geological data from the user to a software supplier, the software supplier executing the locking logic to lock the specific copy of the application program to the specific geological data so that the specific copy of the application program is able to access only the specific geological data.

28. The method of claim 19 including sending the locked specific copy of the application program and specific geological data from the user to the software supplier.

29. The method of claim 28 wherein the sending comprises propagating the specific geological data over a communications network.

30. The method of claim 28 wherein the sending comprises supplying the software supplier with a physical storage medium that stores the specific geological data.

31. The method of claim 19 wherein the locking is performed by locking logic, the method includes sending the locking logic and the application program from a software supplier to the user, the user executing the locking logic to lock the specific copy of the application program to the specific geological data so that the specific copy of the application program is able to access only the specific geological data.

32. The method of claim 31 including purging the locking logic from a computer system of the user subsequent to the locking of the specific copy of the application program to the specific geological data.

33. The method of claim 31 wherein the sending comprises propagating the locking logic and the application program over a communications network.

34. The method of claim 31 wherein the sending comprises supplying the user with a physical storage medium that stores the locking logic and the application program.

35. A logic set for locking geological data and an analyzer program that analyzes the geological data, the apparatus including:
  first logic to generate a first key;
  second logic to associate the first key with both specific geological data and a specific copy of the analyzer program; and
  third logic to generate gatekeeper logic that, utilizing at least the first key, prevents the specific copy of the analyzer program from analyzing geological data other than the specific geological data;
  wherein the third logic is to generate a second key utilizing the first key and a characteristic value representative of a characteristic of the specific geological data, and to associate the second key with the specific geological data.

36. The logic set of claim 35 wherein the first logic comprises a random number generator.

37. The logic set of claim 35 wherein the second logic comprises a compiler that compiles the specific copy of the analyzer program to incorporate the gatekeeper logic.

38. The logic set of claim 35 wherein the second logic comprises a compiler that compiles the specific copy of the analyzer program to incorporate the first key.

39. The apparatus of claim 35 wherein the third logic comprises a locking routine.

40. Apparatus for locking geological data and an analyzer program that analyzes the geological data, the apparatus including:
  first means for generating a first key;
  second means for associating the first key with both specific geological data and a specific copy of the analyzer program; and
  third means for generating gatekeeper logic that, utilizing at least the first key, prevents the specific copy of the analyzer program from analyzing geological data other than the specific geological data;
  wherein the third means is for generating a second key utilizing the first key and a characteristic value representative of a characteristic of the specific geological data, and for associating the second key with the specific geological data.

41. A logic set for executing an analyzer program to analyze geological data to which it is locked, the apparatus including:
  first logic to identify a first key associated with a specific copy of an analyzer program;
  second logic to identify a second key associated with specific geological data;
  third logic to determine a characteristic parameter representative of a characteristic of the specific geological data;
  fourth logic to derive a gate key utilizing the second key and the characteristic parameter; and
  fifth logic to allow executing of the specific copy of the analyzer program to analyze the specific geological data if the gate key corresponds to the first key.

42. A logic set for executing an analyzer program to analyze geological data to which it is locked, the method including:
  first logic to identify a first key associated with a specific copy of an analyzer program;
  second logic to identify a second key associated with specific geological data;
  third logic to determine a characteristic parameter representative of a characteristic of the specific geological data;
  fourth logic to derive a gate key utilizing the first key and the characteristic parameter; and
  fifth logic to allow execution of the specific copy of the analyzer program to analyze the specific geological data if the gate key corresponds to the second key.

43. Apparatus for executing an analyzer program to analyze geological data to which it is locked, the apparatus including:
  first means for identifying a first key associated with a specific copy of an analyzer program;
  second means for identifying a second key associated with specific geological data;
  third means for determining a characteristic parameter representative of a characteristic of the specific geological data;
  fourth means for deriving a gate key utilizing the second key and the characteristic parameter; and
  fifth means for allowing execution of the specific copy of the analyzer program to analyze the specific geological data if the gate key corresponds to the first key.

44. Apparatus for executing an analyzer program to analyze geological data to which it is locked, the method including:
  first means for identifying a first key associated with a specific copy of an analyzer program;
  second means for identifying a second key associated with specific geological data;
  third means for determining a characteristic parameter representative of a characteristic of the specific geological data;
  fourth means for deriving a gate key utilizing the first key and the characteristic parameter; and
  fifth means for allowing execution of the specific copy of the analyzer program to analyze the specific geological data if the gate key corresponds to the second key.

45. A machine-readable medium having a sequence of instructions stored thereon that when executed by a machine, cause the machine to perform the steps of:
  generating a first key;
  associating the first key with both specific geological data and a specific copy of an analyzer program; and generating gatekeeper logic that, utilizing at least the first key, prevents the specific copy of the analyzer program from analyzing geological data other than the specific geological data, wherein the associating of the first key with the specific geological data includes generating a second key utilizing the first key and a characteristic value for a characteristic parameter representative of a characteristic of the specific geological data.

46. A machine-readable medium having a sequence of instructions stored thereon that, when executed by a machine, cause the machine to perform the steps of:

determining a first key associated with a specific copy of an analyzer program;

determining a second key associated with specific geological data;

determining a characteristic parameter representative of a characteristic of the specific geological data;

deriving a gate key utilizing the second key and the characteristic parameter; and allowing execution of the specific copy of the analyzer program to analyze the specific geological data if the gate key corresponds to the first key.

47. A machine-readable medium having a sequence of instructions stored thereon that, when executed by a machine, cause the machine to perform the steps of:

determining a first key associated with a specific copy of an analyzer program;

determining a second key associated with specific geological data;

determining a characteristic parameter representative of a characteristic of the specific geological data;

deriving a gate key utilizing the second key and the characteristic parameter; and allowing execution of the specific copy of the analyzer program to analyze the specific geological data if the gate key corresponds to the second key.

48. A machine-readable medium having a sequence of instructions stored thereon that, when executed by a machine, cause the machine, in response to a user request received over a communications network, to perform the steps of:

automatically providing, over the communications network, a user of the analyzer program with a specific copy of the analyzer program and specific geological data that are locked utilizing at least a first key; and automatically providing, over the communications network, the user of the analyzer program with gatekeeper logic that, utilizing at least the first key, allows the specific copy of the analyzer program to analyze only the specific geological data, the automatic providing including:

associating the first key with both the specific copy of analyzer program and the specific geological data;

determining a characteristic value for a characteristic parameter representative of a characteristic of the specific geological data;

generating a second key utilizing the first key and the characteristic value; and including the second key within the specific geological data.

49. A machine-readable medium having a sequence of instructions stored thereon that, when executed by a machine, cause the machine, in response to a user request received over a communications network, to perform the steps of:

automatically locking a specific copy of an application program to specific geological data so that the specific copy of the application program application program is able to access only the specific geological data; and automatically distributing the locked specific copy of the application program and specific geological data to a user, wherein the automatic locking of the specific copy of the application program to the specific geological data includes generating a second key that is associated with the specific geological data, the second key being generated utilizing the first key and a characteristic parameter representative of a characteristic of the specific geological data.

* * * * *